Patented Jan. 22, 1929.

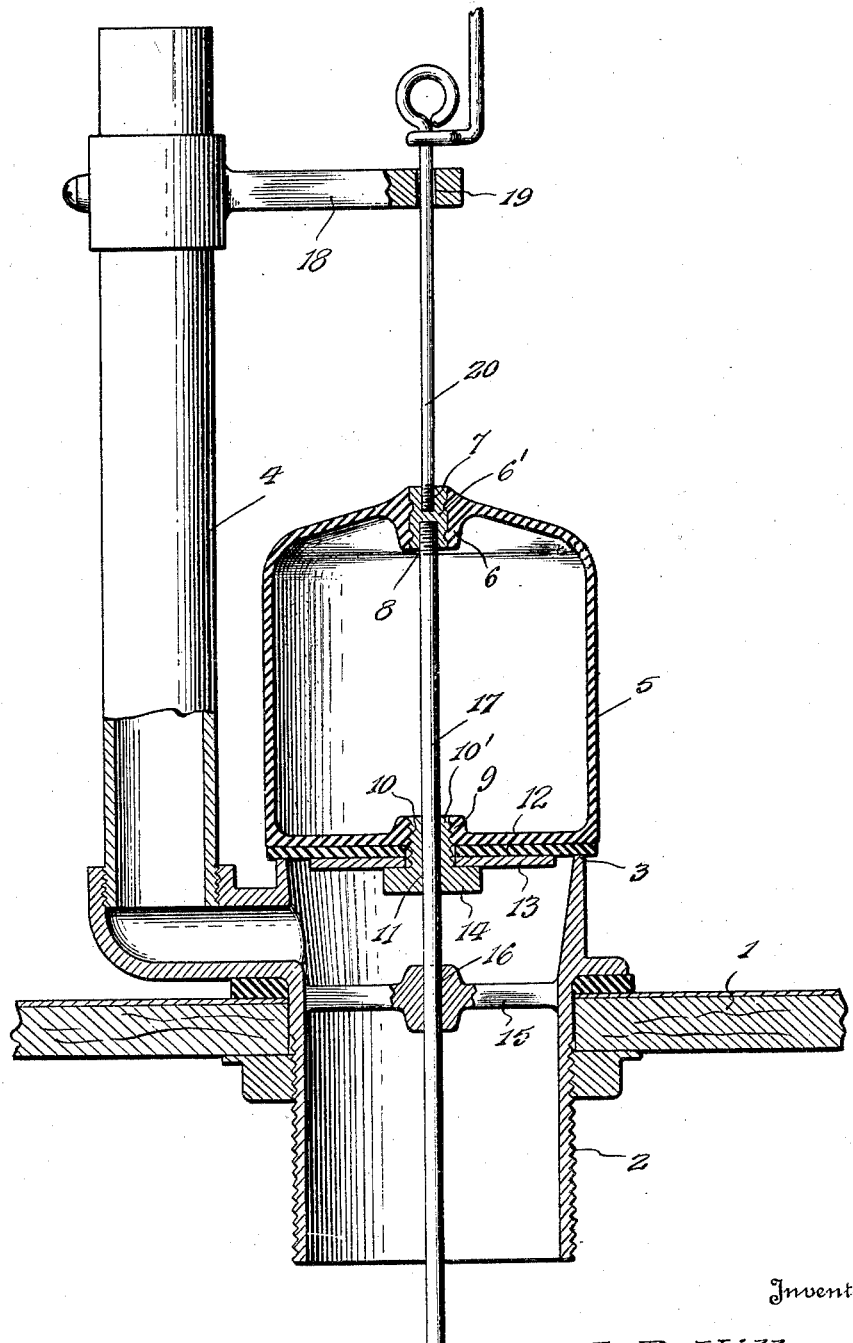

1,699,890

UNITED STATES PATENT OFFICE.

ELIJAH R. HILL, OF NEW ALBANY, MISSISSIPPI.

FLUSH VALVE.

Application filed July 15, 1927. Serial No. 206,091.

The present invention is directed to improvements in flush valves for water closets.

The primary object of the invention is to provide a device of this character which is extremely simple in construction, effective in operation and one which can be manufactured at a very small cost.

Another object of the invention is to provide a valve of this nature which will effectively seal the valve seat to prevent leakage of the water from the tank, the construction being such that the valve will be guided in its movements towards and from the seat.

In the drawing, the figure represents a vertical sectional view through the device.

Referring to the drawing, 1 designates a section of the bottom of the usual flush tank and in which is fitted a pipe 2, the upper end of which constitutes a valve seat 3. The overflow pipe 4 is connected with the pipe 2 in the usual manner.

The valve per se, comprises a hollow body 5 formed from hard rubber, said body having its top wall formed with an enlargement 6 which has embedded therein a metal plate 6' provided with non-communicating threaded sockets 7 and 8, the purpose of which will be later explained. The upper side of the bottom wall of the body 5 is provided with an enlargement 9 located centrally thereof and in which is formed a threaded opening 10 in which is threaded the shank 10', said shank having an axial bore 11. A rubber disc valve 12 is fitted upon the shank and normally closes the seat 3, there being a metallic washer 13 upon said shank, said disc valve and washer being maintained upon the shank by the head 14 formed upon its lower end.

The pipe 2 has a transverse bar 15 located therein and provided with an opening 16 in which is slidably guided the rod 17, said rod being passable through the axial bore 11, and has its upper end threaded in the socket 8. The rod 17 not only guides the body 5 during the vertical movement thereof, but also serves to properly position the valve disc with respect to the seat 3.

A bracket 18 is connected to the pipe 4 and slidably guided in the opening 19 thereof is a rod 20 which has its lower end threaded in the socket 7. This rod, as customary, is controlled by the usual float arm.

While I have illustrated and described the float 5 as being formed from hard rubber, it will be understood that it may be made from sheet metal if desired.

Having thus described the invention, I claim:

A flush valve comprising a hollow body, said body having an enlargement formed upon the upper surface thereof, a plug mounted therein and having a socket, an enlargement carried upon the bottom wall of the body, a threaded shank fitted in the last named enlargement and alined with the plug, said shank having an opening formed therethrough, a valve disc fitted upon the shank, a washer fitted upon the shank and engaged with the valve disc, a head upon the shank for maintaining the washer and valve disc therein, a rod having its upper end threaded in said socket and extending through the opening of the shank, a discharge pipe having a guide mounted therein for slidably receiving said rod, said pipe having its upper end provided with a seat for normally engaging the valve disc.

In testimony whereof I affix my signature.

ELIJAH R. HILL. [L. S.]